United States Patent [19]

Haneda et al.

[11] Patent Number: 4,959,669
[45] Date of Patent: Sep. 25, 1990

[54] COLOR CORRECTION DEVICE FOR A COLOR IMAGE FORMING APPARATUS

[75] Inventors: Satoshi Haneda; Hisashi Shoji, both of Hachioji; Kunihisa Yoshino, Mitaka, all of Japan

[73] Assignee: Konica Corporation, Tokyo, Japan

[21] Appl. No.: 201,206

[22] Filed: Jun. 2, 1988

[30] Foreign Application Priority Data

Jun. 3, 1987 [JP] Japan .................... 62-140414

[51] Int. Cl.$^5$ .................... G03G 15/01; G01D 15/06
[52] U.S. Cl. .................... 346/157; 355/326; 358/80; 358/300
[58] Field of Search .................... 355/326, 327, 328; 346/157; 358/75, 80, 300

[56] References Cited

U.S. PATENT DOCUMENTS

| | | | |
|---|---|---|---|
| 4,577,219 | 3/1986 | Klie et al. | 358/75 X |
| 4,580,889 | 4/1986 | Hiranuma et al. | 358/75 X |
| 4,663,662 | 5/1987 | Sekizawa et al. | 358/75 |
| 4,680,625 | 7/1987 | Shoji et al. | 358/80 |
| 4,701,790 | 10/1987 | Yamada | 358/75 |
| 4,769,695 | 9/1988 | Terashita | 358/80 X |
| 4,791,450 | 12/1988 | Mosehauer et al. | 358/75 X |

Primary Examiner—Fred L. Braun
Attorney, Agent, or Firm—Finnegan, Henderson, Farabow, Garrett, and Dunner

[57] ABSTRACT

A color image processing apparatus including an image-reading device for reading a color image on an original to obtain first color image data, an image memory which stores the first color image data, and a factor memory which stores a predetermined correction factor. A color correction system corrects the first color image data with the correction factor. An image-producing apparatus produces a color copy image on the basis of the corrected first color image data, where the image-reading device reads the color copy image to obtain second color image data. The image-processing apparatus further includes a processing member which performs a comparison between the first color image data stored and changes the correction factor on the basis of the comparison.

4 Claims, 14 Drawing Sheets

COLOR CORRECTION DEVICE FOR A COLOR IMAGE FORMING APPARATUS

BACKGROUND OF THE INVENTION

The present invention relates to a color image forming apparatus that forms a color image by sequentially forming toner images on an image carrying member, and that is used in the industrial fields of electrostatic recording and electrophotography.

It has been conventional practice, in forming a color image by electrophotography, to repeat electrifying, imagewise exposing, developing, and transferring for every independent color component and form the respective color toner images that are aligned in an overlapping manner on a copying sheet. More specifically, to form a color image, that is, to form respective color toner images of yellow (Y), magenta (M), cyan (C), and black (BK) toners using the light modulated based on the color information data derived from a color document, the above-mentioned process is repeated four times. Such a color image forming system, however, requires that every toner image should be transferred onto a transfer member every time the independent toner image has been developed. Thus, such an image forming system has problems, including a larger copying apparatus, a complicated recording process, and disadvantageously long copying time. Other disadvantages include an inferior color image formed due to misalignment of transferred toner images, since the respective color toner images are independently transferred onto a recording sheet in independent transferring processes.

To overcome such disadvantages, there is a color image forming method wherein a plurality of toner images formed on a common photosensitive member are simultaneously developed in order to perform a transferring process at once. This method, however, still has disadvantages; a toner image previously developed is spoiled when another toner image is developed, or, color balance on a final image is deteriorated because a toner of a former image is blended with a developer for an image later formed.

To overcome such disadvantages, there is proposed a method in Japanese Patent Publication Open to Public Inspection (hereinafter referred to as Japanese Pat. O.P.I. Publication) No. 144452/1981, wherein developing performed while a photosensitive member is not allowed to come into contact with the turf of a developer layer. In this developing method, the operation of an AC bias applied allows a toner contained in a developer to jump to the photosensitive member, whereby developing is performed on the non-contactive basis.

The principle of image forming method according to the developing method disclosed as above is hereunder described. The flowchart in FIG. 19 shows the change in surface potential on a photosensitive member where positive polarity charging is performed and developing is also performed using a toner of positive polarity. PH represents an exposing area on the photosensitive member; DA, a non-exposing area on the photosensitive member; DUP, an increase in potential caused because the positively charged toner T has been deposited on the exposing area PH in the first developing; CUP, an increase in potential on the exposing area PH due to the second electrifying.

The photosensitive member is subjected to uniform electrifying using a Scorotron electrifier, and endowed with a uniform surface potential E. The surface potential E in the exposing area PH drops to near-zero level by the first image exposing using irradiation of an exposing light source such as a laser, cathode ray tube, and light-emitting diode. The positive bias, of which DC component being virtually equal to the surface potential E on an unexposed area, is applied onto a developing unit, and developing is performed, whereby the positively charged toner in the same developing unit adheres onto the exposing area PH that has a relatively low potential, and, as a result, a first positive image is formed. The potential on the area where the positive image has been formed rises by a DUP due to the positively charged toner adhering thereon. Next, when the second electrifying is performed on the Scorotron electrifier, the surface potential further rises by a CUP, thereby the surface potential E reaches a level approximately same as that of the non-exposing area DA. The surface of photosensitive member endowed with the uniform surface potential E is subjected to the second imagewise exposing to form an electrostatic latent image which is developed in a manner previously mentioned to form the second positive image.

When the above procedure is repeated it forms overlapping forms toner images on the photosensitive member, and a single color toner image is obtained. The color toner image is then transferred onto a recording sheet, thereby fixed by pressure or by heating, to form a color image. At this time, the toner and potential present on the photosensitive member are removed and neutralized correspondingly, in order to prepare next color image forming. In addition, the previously mentioned color image forming method can incorporate the neutralizing process prior to the electrifying process. Furthermore, a common exposure light source or different light sources may be used for respective image exposing.

Incidentally, in a color image forming method, when reproducing color tones by overlapping three primary colors, namely, Y, M and C, the BK component is theoretically deemed unnecessary based on the principle of subtractive color reproduction. However, when reproducing a sharp image such as a character or line drawing, it is necessary to enhance black compared to the three primary colors. For such a purpose, forming black by overlapping the three primary colors is insufficient. This problem is attributable to the fact that the three primary color toners in practical application do not have an ideal absorption wavelength region, and that a minor misalignment is inevitable since strictly aligning toner images of three primary colors is impossible. Additionally, in the additive color reproducing process, there is problem such as insufficient image density attributable to the same reasons. Accordingly, in forming a color image, a developing unit containing a black toner is usually incorporated.

In forming a color image according to electrophotography, two methods are generally available: a normal developing method where developing is performed on an electrostatic image on a photosensitive member using a toner having a polarity reverse to that of the electrostatic image, and a reverse developing method where an electrostatic image is developed using a toner having a polarity common with that of the electrostatic image. The reverse developing method is advantageous in that unlike the normal developing method that necessitates a background of image which is continuously exposed, this method only requires the area where a toner adheres solely exposed. Therefore, strict mechanical precision is not required of the associated optical system and the service life of photosensitive member tends to be longer since the member is less frequently subjected to fatigue, and since the electrical potential on the photosensitive member and the toner adhering thereon are of a common polarity.

Accordingly, a recording apparatus having an exposing light source such as a laser, cathode ray tube, and light-emitting diode often incorporates the reverse developing method. However, forming a color toner image on a photosensitive member in compliance with the reverse developing method incurs the following problem. An area where a toner adhered by a prior developing does not readily allow the imagewise exposing light to be transmitted. Even if such light has been transmitted, the surface potential on the photosensitive member does not decrease because of the potential on the toner image. Accordingly, a toner does not readily adhere onto the member in development later performed. In the additive color reproducing method, similar problems occur since perfect alignment, as well as perfect developing in compliance with the nature of independent latent image, are difficult. Accordingly, a desirable color image is not formed when intending to reproduce various color tones, because of deteriorated color balance or since the image is disturbed around the edge portions.

In summary, in image reproducing the need exists for image processing that eliminates the previously mentioned effects regarding the toner images.

However, in electrophotography, the charge potential on a photosensitive member, charge level on a toner, and amount of a toner adhering onto the member vary depending on ambient conditions or in the course of service life. Accordingly, it is quite difficult to control these factors satisfactorily.

Because of these reasons, a user had to manually adjust color balance among Y, M and C color components by comparing an original document with a resultant duplicate. Accordingly, the user has had to make several duplicates while seeking optimum color balance.

SUMMARY OF THE INVENTION

The object of the present invention is to achieve color reproduction of high fidelity, or to achieve color reproduction of high fidelity in a designated area. More specifically, the object of the invention is to provide a color image forming apparatus that forms a vivid color image with good color balance and free from imaging failure, by comparing an original image with a duplicated image to correct and modify the tone and gradation in image data, and by using the modified data to form a color image.

This object of the invention is attained by a color image forming apparatus comprising image reading means, means for performing color correction on image data including information on a plurality of colors, means for forming a latent image on an image carrying member based on the results of color correction performed by the aforesaid means, and a plurality of developing means for developing, by the using color toners, the latent image formed by aforesaid means, whereby a color image is formed by sequentially forming a plurality of independent toner images on the image carrying member, wherein the above-mentioned color correction means has an arithmetic processing portion for changing tone and gradation in the above-mentioned image data by the comparing the image data of the duplicate with those of the original document.

The color image forming apparatus of the invention is a copying apparatus comprising image reading means and color image output means, wherein both the data of original document and those of duplicate are input by the image reading means, and both sets of image data are compared with each other for color correction. The color correction feature is used in the following manner:

(i) A specific area on a document is entered by area designating means, whereby color reproduction on the designated area is given a priority of attaining color balance to other areas, or, otherwise, image correction is performed solely on an independently designated area;

(ii) Using a color control chart as a document allows correction on overall color balance. Deliberately selecting a color control chart can perform correction as intended. For example, when correcting colors on characters or illustration, a chart containing Y, M, C, B (blue), G (green), R (red), and BK (black) is used; when performing gradation correction for a photograph, for example, a chart including a gray scale and varied densities is used.

(iii) In these correction procedures, correction parameters obtained by arithmetic operations are stored in a memory.

DETAILED DESCRIPTION OF THE INVENTION

The preferred embodiments according to the invention are hereunder described.

Figure 1A:
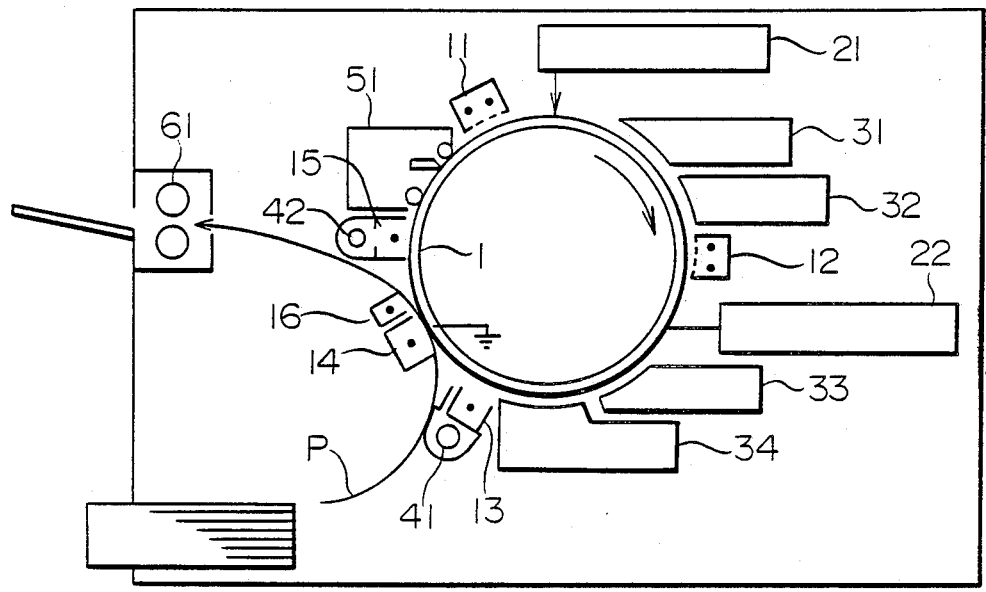
FIGS. 1(a) and (b) schematically illustrate the general arrangement of color image forming apparatuses, each a preferred embodiment of the present invention.

In the image forming apparatus in FIG. 1(a), numeral 1 represents a drum-shaped image carrying member comprising a photoconductive photosensitive layer made, for example, of Se and rotatable in the arrow direction; 11 and 12, electrifiers for uniformly electrifying the surface of the image carrying member 1; 21 and 22, imagewise exposing areas for independent color toner images; 31 through 34, developing units, respectively, having differently colored toners, i.e, toners of cyan (C), magenta (M), yellow (Y), and black (BK); 13 and 41, respectively, a pre-transfer electrifier and a pre-transfer exposing lamp each provided in compliance with a specific requirement in order to allow a color image, that comprises a plurality of color toner images in an overlapping formed on the image carrying member, to be readily transferred onto a transfer member P, or to allow the transfer member P to be readily separated from the image carrying member; 14, a transferring unit; 61, a fixing unit that fixes a toner image having been transferred onto the transfer member P; 42 and 45, neutralizing lamps or neutralizing corona dischargers, one type of which may be used, or both types of which may be used in combination. Numeral 16 represents a neutralizing electrode for sheet separation; 51, a cleaning unit having a cleaning blade on fur brush that comes in contact with the surface of the image carrying member 1 in order to remove a toner remaining on the same surface from which the color image has been transferred, and that leaves from the surface of the image carrying member 1 by the time the area which has undergone the first developing reaches the area corresponding with the same unit.

If the electrifiers 11 and 12 are of a type that additionally electrify the already electrified surface on the image carrying member 1, it is particularly favorable to use a Scorotron discharger, for example as shown in the figure, which is less affected by previous electrification and capable of providing stable electrification. Additionally, in such an image forming apparatus as shown here and having the drum-type image carrying member 1, the imagewise exposing lights 21 and 22 can be those formed by separating slit exposing light into independent color components using a filter as used in the case of a conventional monocolor electrophotographic copying apparatus. However, to reproduce a vivid color image, it is preferable that the imagewise exposing lights be laser beam scanners shown in FIGS. 4(a), (b) and (c) where imagewise exposing is performed and a resultant latent image is reverse-developed. When using the laser beam scanners shown in FIGS. 4(a) and (b) for forming the imagewise exposing light 104, it is possible to readily form a plurality of latent images of different colors at different timing, and, therefore, to reproduce a vivid color image.

Figure 1B:
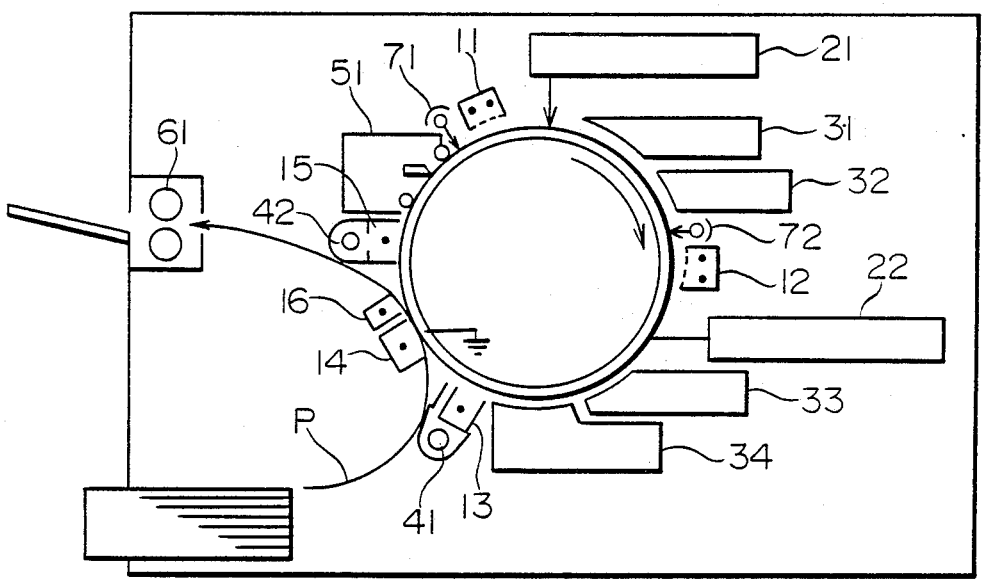

The apparatus in FIG. 1(b) is different from that of FIG. 1(a) in that in the former apparatus, infrared LEDs 71 and 72 are used to perform uniform exposing. This arrangement is effective for a photosensitive member of greater light memory property.

The infrared LEDs 71 and 72, respectively, have a characteristic wavelength allowing the light emitted to pass through the already deposited toner.

Figure 4A:
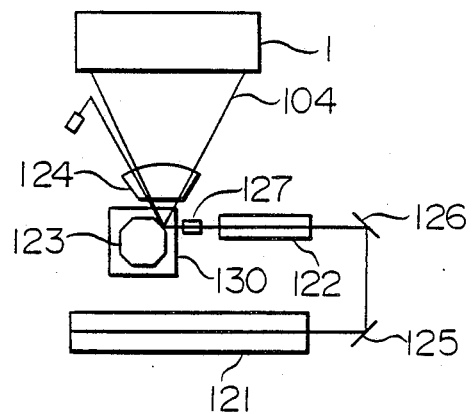
FIGS. 4(a), 4(b), and 4(c) schematically illustrate laser beam scanners for imagewise exposing.
Figure 4B:
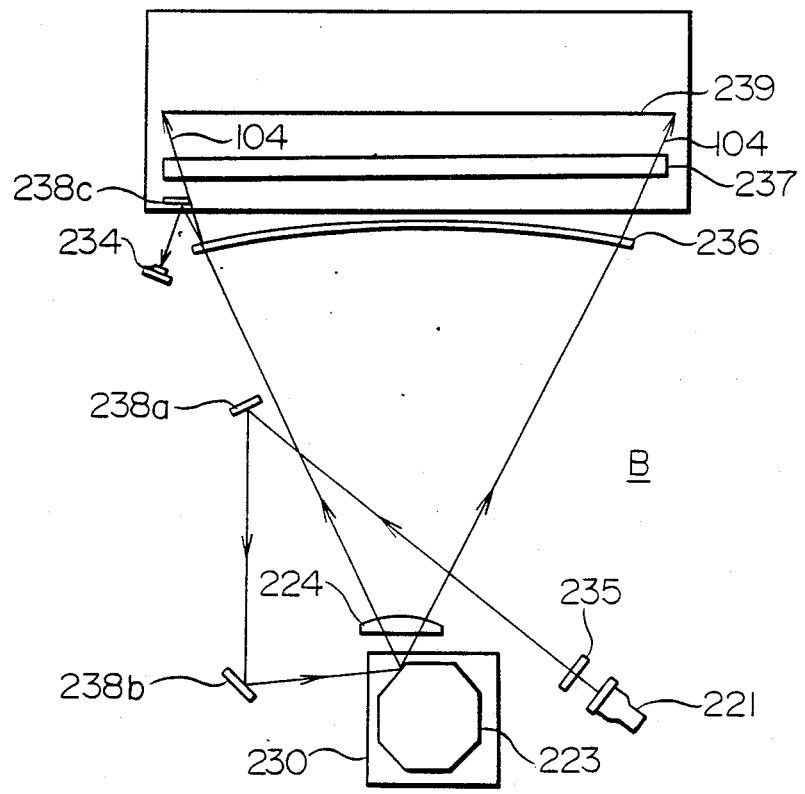

In the laser beam scanner of FIG. 4(a), a laser beam is emitted from laser 121, such as a He—Ne laser. The laser beam is thereby intermittently transmitted by an acoustic optical modulator 122 and deflected by a mirror scanner 123 that is rotated by a driving motor 130 and comprises an octahedral rotatable polygon mirror, and is thereby directed through a focalizing f-$\theta$ lens 124. The beam comprises an imagewise exposing light 104 that scans the surface on the image carrying member 1 at a constant velocity. Numerals 125 and 126 represents mirrors; 127, a lens that optimizes the diameter of beam directed to the focalizing f-$\theta$ lens 124. A laser beam scanner having the arrangement in FIG. 4(b) is also advantageous, wherein a laser beam generated by a semiconductor laser 221 is reflected by a polygon mirror 223 that is rotatably driven by a driving motor 230. The beam transmitted via a f-$\theta$ lens 224 is thereby deflected by a reflector mirror 237, and projected onto the surface of the image carrying member 1 and forms an emission line. Numeral 234 represents an index sensor that detects the beam position in order to control the initiation of beam-scanning; numerals 235 and 236 are cylindrical lenses for correcting inclination angles. Numeral 238a, 238b, and 238c represent reflector mirrors that compromise both a beam scanning path and a beam detection path. When using the laser beam scanner described in Japanese Pat. Application No. 239469/1986 filed by the present applicant, as well as an insulating plate, such as a optical deflector 223' processed by etching a crystal plate, the bidirectional scanning is enabled, unlike the scanning with a rotating polygon mirror. When performing such bidirectional scanning, the optical scanning system can have an arrangement for example, shown in FIG. 4(c).

More specifically, by disposing index sensors 234 and 234' in the forward and rear zones on scanning direction, the start and end (the "end" may be deemed the "start" of scanning, since the beam starts return pass) of one forward scanning pass using a laser beam can be detected, and, accordingly, the relevant image information is recorded on the image carrying member 1.

Figure 4C:
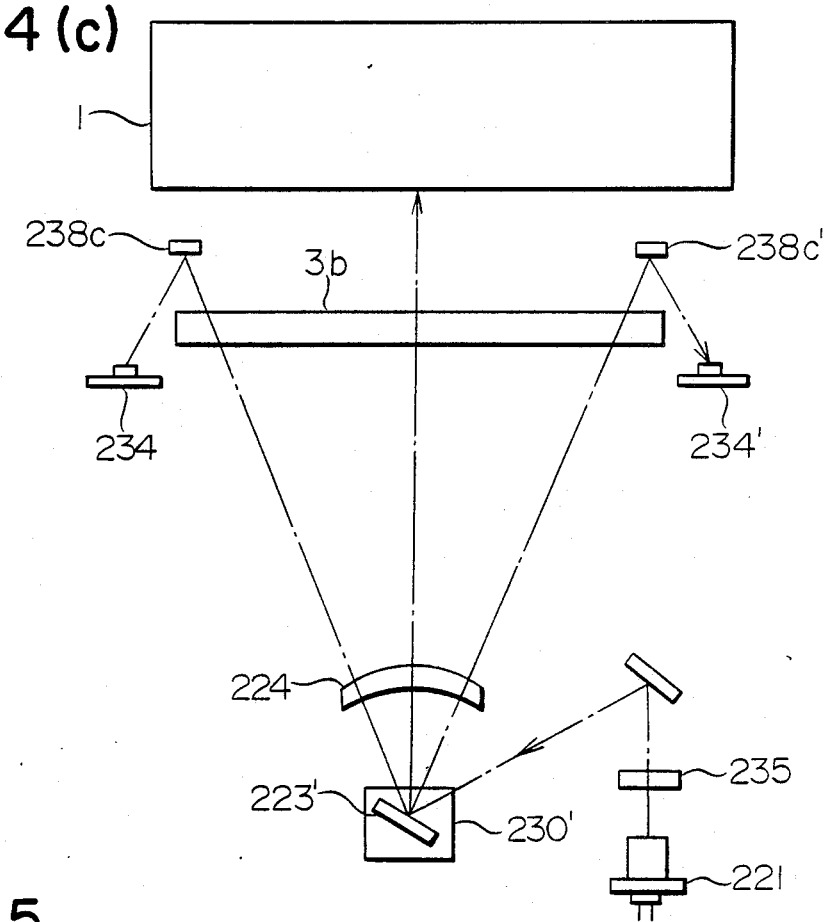

In FIG. 4(c), numerals 238c and 238c' respectively represent a reflector mirror.

Once scanning starts, the beam is detected by the index sensor 234 or 234', and an unshown modulator starts modulating the beam based on the first color signal. The modulated beam scans the surface of the image carrying member 1 that has been already uniformly electrified with the electrifier 11 or 12. Then, a latent image corresponding with a first color is formed on the surface of the drum with the main scanning by the laser beam 104 and with the sub-scanning by rotation of the image carrying member 1.

Additionally, the imagewise exposing light 104 is not limited only to the above-mentioned dot exposing using a laser beam, and can be one using, for example, an LEd, CRT, liquid crystal, or fiber optics. The image forming apparatus according to the invention can be a recording system having a belt-configured image carrying member.

Figure 2:
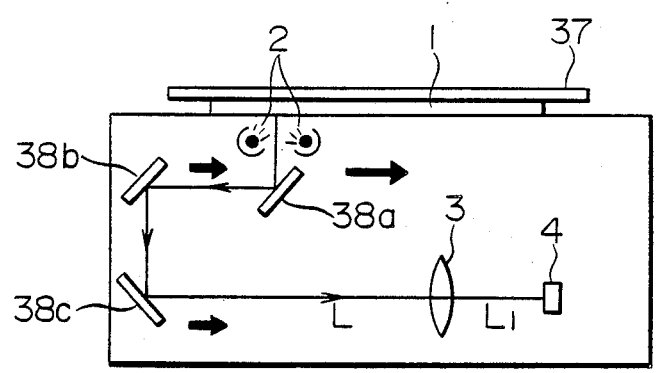
FIG. 2 schematically shown the arrangement of a color image reader.

In the image reader on FIG. 2, numeral 37 represents a document presser that presses a document 1 against a platen; 38a, 38b, and 38c, respectively, a reflector mirror that reflects light L obtained when subjecting the document 1 to imagewise exposing using an exposing lamp 2. The light L reflected by the group of reflector mirrors is converged by a lens 3 and directed to a linear image sensor 4, and is thereby converted into an electrical signal. The arrow indicates a direction along which a light source 2, the group of mirrors 38a, 38b, and 38c are shifted for sub-scanning. The light $L_1$ converged by the lens 3 projects a reduced image onto the surface of the CCD image sensor 4 shown in FIG. 3 and having a mosaic filter layer 42 comprising B, G and R elements. The light $L_1$ irradiates sensor elements 41 disposed linearly and densely on the CCD image sensor 4, and is thereby converted into an electric signal. Being driven by two phase pulses 43 ($\phi_1$, and $\phi_2$) at the velocity corresponding with the pulse frequency of transfer gate pulse 44, the photoelectrically obtained electrical signal is transferred along the main scanning direction shown by the arrow X on the transfer portion (CCD shift register) and is output from an output 46. The resultant output signal is being input to the modulator of the laser beam scanner in FIG. 4 via a signal system in the image forming system in FIG. 11 described later. The color image reader of the invention may incorporate a method where three primary color components so-separated by a dichroic mirror are independently fed into the CCD or a method where a document is optically scanned using a color contact image sensor.

Figure 5:
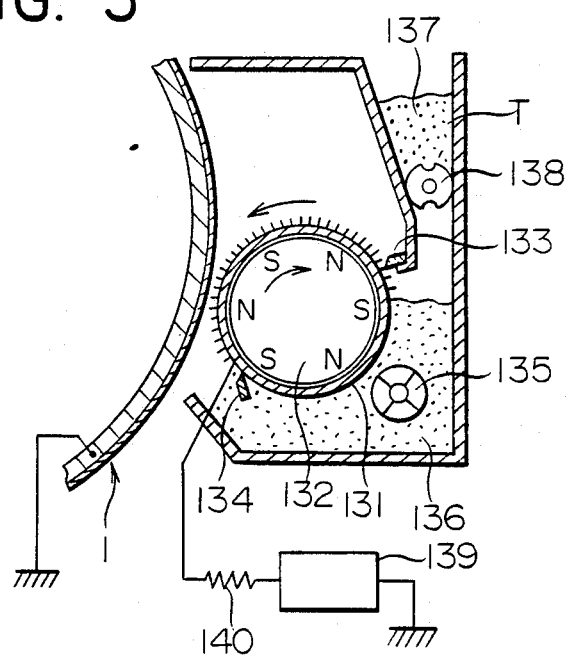
FIG. 5 is a cross-section of the principal area of a developing unit.

Developing units 31 through 34 each preferably have a structure illustrated in FIG. 5.

In FIG. 5, numeral 131 represents a development sleeve comprising a non-magnetic material such as aluminum or stainless steel; 132, a magnetic member disposed within the development sleeve 131 and circumferentially having a plurality of magnetic poles; 133, a developer layer thickness regulating blade that regulates the thickness of developer layer formed on the development sleeve 131; 134, a scraper blade that removes a developer layer remaining on the development sleeve 131 once developing is complete; 135, an agitating rotary member that agitates the developer in a developer reservoir; 137, a toner hopper; 138, a toner supply roller having recesses and supplying a toner from the toner hopper 137 to the developer reservoir 136; 139, a power supply that applies a bias voltage sometimes including a vibrating voltage component onto the development sleeve 131 via a protective resistor in order to form an electric field for controlling the behavior of toner which moves between the development sleeve 131 and the image carrying member 1. In this figure, the development sleeve 131 and the magnetic member 132 rotate in the directions of the respective arrows. However, the development sleeve 131 may be of a fixed type, or the magnetic member 132 may be of a fixed type, or both the development sleeve 131 and the magnetic member 132 may rotate in a common direction. When a fixed type magnetic member 312 is used, in order to increase the magnetic flux density of a magnetic pole facing the image carrying member 1 to greater than that of another magnetic pole, magnification is usually enhanced for this specific pole, or a pair of magnets of the same polarity or of different polarities is disposed in this area wherein the pair of magnets is positioned in close proximity with each other.

In such developing units, the magnetic pole on the magnetic member 132 usually has a magnetism of a 500 to 1500 Gauss magnetic flux density. The developer in the developer reservoir 136 is thereby attracted to the surface of the development sleeve 131 by the magnetic force, and the thickness of developer deposited on the sleeve 131 is regulated by the layer thickness regulating blade 133 to form a developer layer. The developer layer travels in a direction in common with or reverse to the direction of rotation of the image carrying member 1 indicated by the arrow (in this figure, to the common direction. Thus in the developing area facing the surface of the image carrying member 1, the developer develops an electrostatic latent image on the image carrying member, and remaining developer is removed from the surface of the development sleeve 131 by the scraper blade 134 and collected into the developer reservoir 136. In the second developing onwards which is recurringly performed to form color toner images in an overlapping manner, on a non-contactive basis is preferred, so as not to put the toner already deposited on the image carrying member in the preceding developing. In a non-contactive developing system, the developer layer on the development sleeve 131 is not in contact with the image carrying member when the developing bias is not applied, and, once a D.C.-A.C. composite bias is applied onto the development sleeve 131, a toner is allowed to jump and adhere to the image carrying member 1 in the presence of an alternating electric field.

FIG. 5 illustrates a state where developing is performed according to the non-contactive developing system.

The respective developing units 31 through 34 preferably use the so-called two component developer comprising a non-magnetic toner and a magnetic carrier. With this type of developer, the toner does not need black or brown magnetic material, whereby a vividly colored toner can be obtained, and potential on a toner is easily attained. Such a magnetic carrier is preferably an insulative carrier of which resistivity being not less than $10^8$ $\Omega$cm, preferably, not less than $10^{13}$ $\Omega$cm, wherein carrier particles independently comprise a resin, e.g., a styrene resin, vinyl resin, ethylene resin, rosin modified resin, acrylic resin, polyamide resin, epoxy resin, or polyester resin, which contains dispersed fine particles of ferromagnetic or paramagnetic material, i.e., triiron tetraoxide, Y-ferric salt, chromium dioxide, manganese oxide, ferrite, or manganese-copper based alloy; or wherein the carrier particles independently comprise a particle of any of these magnetic materials, and the surface of the particle is coated with any of the above-mentioned resins. If this resistivity is excessively small, an electrical potential is injected into carrier particles once a bias voltage is applied onto the development sleeve 131, whereby the carrier particles disadvantageously tend to adhere onto the surface on the image carrying member 1 too strongly, or the bias voltage fails to be satisfactorily applied onto the image carrying member 1. The carrier particles too strongly adhering onto the image carrying member 1 adversely affect the tone reproduction of a color image.

The resistivity is a value obtained as follows: carrier particles are loaded and tapped in a container having a cross-section of 0.50 cm$^2$, thereby a load of 1 kg/cm$^2$ is applied onto the compacted particles, and then, a current value corresponding with a voltage that generates an electric field of 1000 V/cm between the load and the bottom electrode is read.

A carrier of average particle size of not larger than 5 m will result in too small a magnification; a carrier of not smaller than 50 $\mu$m fails to improve image quality and readily causes breakdown and discharge, resulting in difficulty in applying a high voltage. To sum up, the preferred average particle size is not less than 5 $\mu$m and nor more than 50 $\mu$m. In compliance with a specific requirement, to the carrier particles is added an additive such as a fluidity improving agent made of anhydrous silica or the like.

The preferred toner comprises particles, of average size of 1 to 20 μm, that incorporate various pigments, and, in compliance with a specific requirement, a triboelectricity controlling agent or the like. The preferred toner also has an average electrification level of 3 to 300 μc/g, in particular, 10 to 100 μc/g. A toner of average size of not larger than 1 μm does not readily leave carrier particles; a toner of not smaller than 20 μm decreases resolution of an image.

Figure 3:
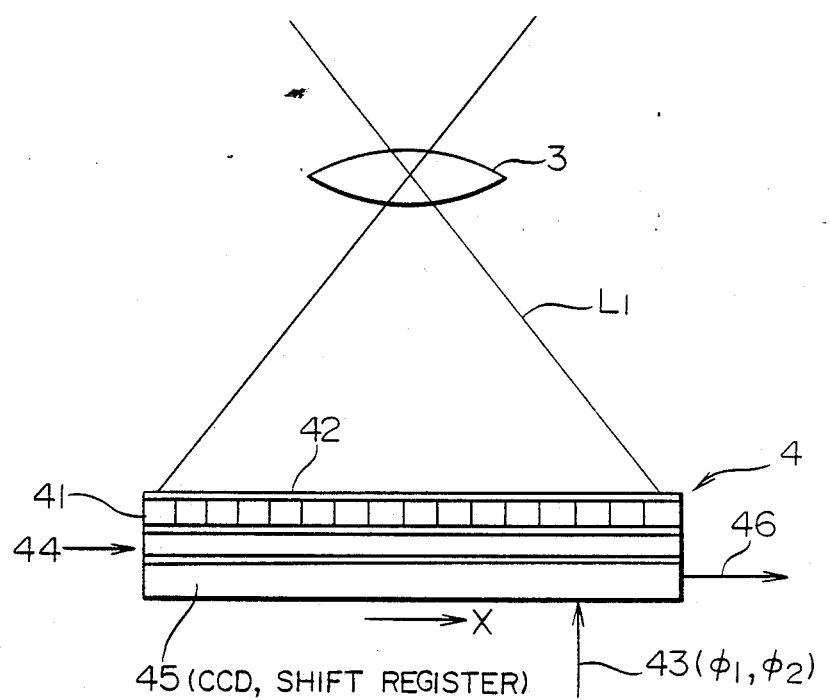
FIG. 3 illustrates a line image sensor on a CCD that reads a color image.

Using such a developer comprising an insulative carrier and toner allows a bias being applied onto the development sleeve 131 in FIG. 3 to be determined so that a toner is sufficiently adhered to an electrostatic latent image and fog is eliminated, while the possibility of leak current is also eliminated. In order to allow the toner to be more readily transported in the course of developing in the presence of a bias voltage being applied, a toner may contain a magnetic material that can be used in a magnetic carrier in an amount that does not deteriorate the vividness of toner color.

The arrangement of the developing units, as well as the composition of developer advantageously used in the practice of the invention are as above described. However, the scope of the invention is not limited only to these descriptions. In the practice of the invention, other useful developing units and developers are described in Japanese Pat. O.P.I. Publication Nos. 30537/1975, 18656/1980 through 18659/1980, 144452/1981, 116553/1983 through 116554/1983. More specifically, the arrangement of an image forming apparatus is preferably in compliance with the non-contactive developing conditions using a two-component developer as specified in Japanese Pat. O.P.I. Publication Nos. 57446/1983, 96900/1983 through 96903/1983, 97973/1983, 192710/1985, 192711/1985, 14537/1985, 14539/1985, and 176069/1985, each filed by the present applicant. The developing unit disclosed in Japanese Pat. O.P.I. Publication No. 176069/1985 is particularly advantageous in that a magnetic member within a development sleeve is of a fixed type, and developing is performed in an area between magnetic poles where the thickness of developer layer is smaller. The developing gap is resultingly smaller, and it is thus possible to form sufficiently great developing electric field and to achieve high developing performance. A magnetic member of a fixed type is advantageous in realizing an image forming apparatus that has a plurality of developing units.

Every imagewise exposure must be performed on an exact specific position of an image carrying member. Designation of an imagewise exposing area is readily and accurately achieved by detecting the position and controlling the imagewise exposure timing with an index marker for registration (unshown, one or plurality of markers based on a requirement) for registration disposed on a specific location on the image carrying member, or using a conventional photosensor that detects, every time the image carrying member turns, a pulse or the like generated by an encoder rotating in conjunction with the image carrying member. Such an arrangement eliminates a color image of misaligned toner images.

The laser optical systems below especially accurately eliminate a misaligned image: a polygon mirror used in conjunction with, as optical scanning means, position controlling methods disclosed in Japanese Pat. O.P.I. Publication Nos. 161566/1981, 64718/1982, and 53866/1984; a method for forming a plurality of laser beams with a polygon mirror as described in Japanese Pat. O.P.I. Publication No. 150066/1985; and a method for forming a plurality of laser beams using an optical modulator.

Additionally, as mentioned previously, according to the above-mentioned recording system a toner image formed on the image carrying member 1 is directly transferred onto a transfer member P with a transferring unit 14, without using a transfer drum. This arrangement eliminates misaligned toner images and enables a smaller copying apparatus.

Figure 6:
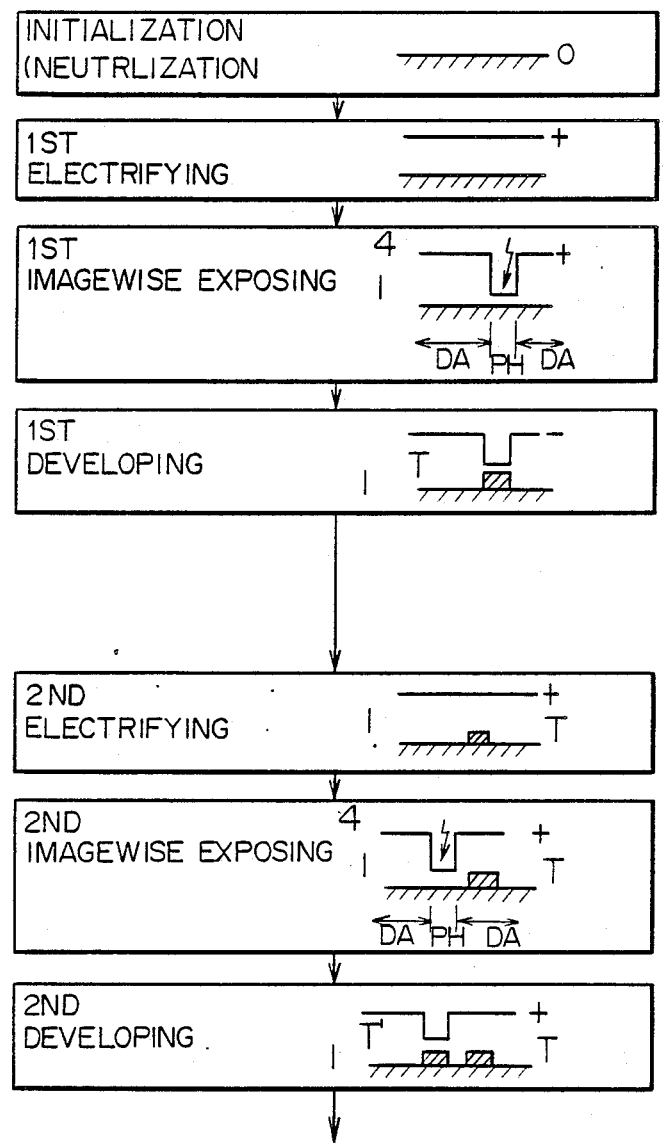
FIGS. 6 and 19 are flowchart, respectively, indicating an image forming process.

Using any of the above-mentioned recording apparatus, a color image forming method as illustrated in FIG. 6 can be performed. This figure covers up to the second developing.

FIG. 6 illustrates one preferred embodiment of the reverse developing system according to the invention, wherein an electrostatic latent image is formed according to an electrostatic latent image forming method with this method the imagewise exposed portion constitutes an electrostatic latent image which has a potential level lower than that of background portion. In the course of developing, a toner electrified to have a polarity identical with that of the background portion potential adheres to the latent image.

In the embodiment in FIG. 6 using the recording apparatus of FIG. 1(a), the surface of the image carrying member 1 which has undergone initialization is subjected during the first turn to uniform electrifying by the electrifier 11. The electrified surface is thereby subjected to the first imagewise exposure by irradiating with relevant imagewise exposing light generated by the laser beam scanner in FIG. 4 so that the potential on the electrostatic latent image portion is approximately zero. The resultant electrostatic latent image is subjected to the first developing by a developing unit selected from the developing units 31 and 32, i.e., the developing unit that contains a toner (in this case, unlike the example in FIG. 6, a toner is electrified to have a polarity same as the image carrying member) of which has color corresponding with that of the imagewise exposing light 21. In the next latent image forming onward, once the electrifier 12 is used, the second imagewise exposure is performed by projecting the imagewise exposing light 22 of another color onto a position different from the position where the preceding imagewise exposing light 21 was projected, or by projecting the similar light 22 of a different color onto the same position. The resultant electrostatic latent, images of approximately zero potential are thereby developed by either developing unit 33 or 34 containing a developer of color, toner corresponding to the color of the latent image. Then, in the second turn of the image carrying member, the third and fourth electrifying, latent image forming, developing are performed, as described referring to FIG. 6, and tone cycle of color image recording is complete. In the above example, the potential on an exposing area drops to approximately zero level, even when a toner T is electrified to have a polarity the same as the image carrying member 1, because a laser beam is allowed to pass through the toner T. Accordingly, in developing for adhering a toner T' of another color onto an electrostatic latent image formed later, the toner T' adheres in an overlapping manner onto the electrostatic latent image where the toner T has already been deposited and is subjected to exposure i.e., writing.

Therefore, it is possible to form a vivid monocolor or multicolor image based, on a feature that a new toner image is formed in an overlapping manner on a previously formed toner image without being adversely affected by the latter image.

Figure 7:
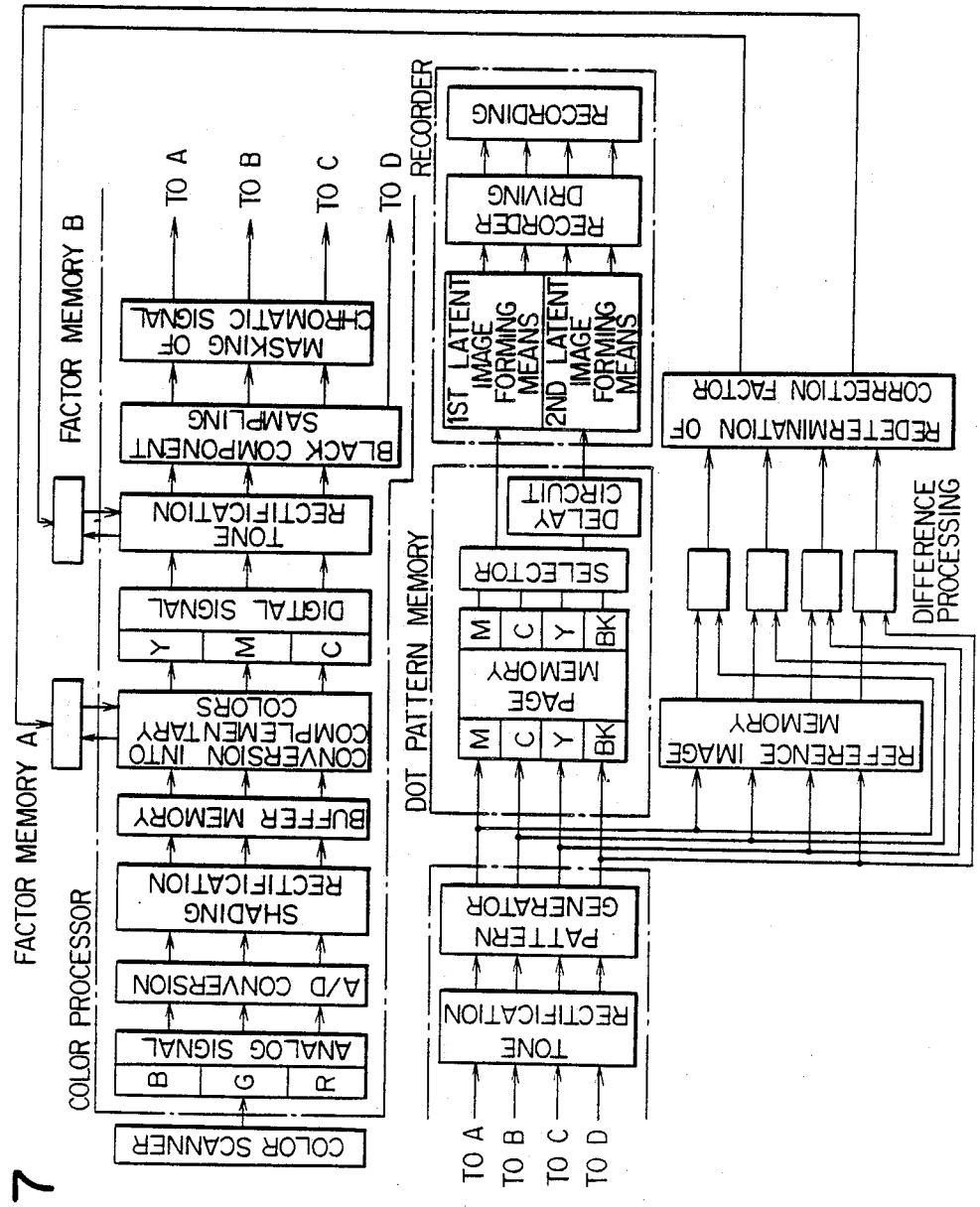
FIGS. 7 and 8 are circuit diagrams of image forming circuits.

Next, the arrangement of a color image forming system according to the invention is hereunder described referring to FIG. 7. This image forming method employs the process of FIG. 6, wherein the control signal from a CPU controllingly drives a recorder, dot pattern memory and image forming process. In conjunction with the travel of the exposing system (lamp 2, mirrors 38a, 38b, and 38c) as shown in FIG. 2, a CCD image sensor 4 that is one type of color scanner longitudinally reads color information of B, G, and R components on a document 1, and outputs an analog video signal. This signal is subjected to A/D conversion, then to shading rectification in order to remove distortion derived from color information and/or optical system, and is temporarily input to a buffer memory so as to align the respective B, G, and R components on a common image position.

FIG. 3 illustrates a CCD color image sensor. Instead, a contact color image sensor may be used.

Figure 11:
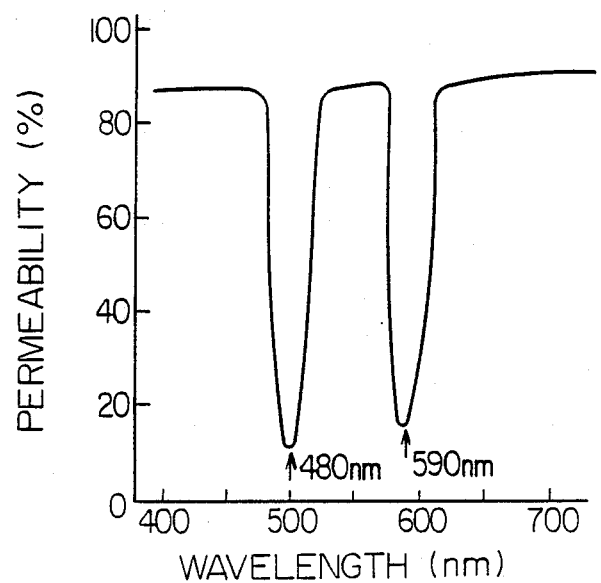
FIG. 11 is a graphical representation of spectral characteristics of a notch filter.
Figure 12:
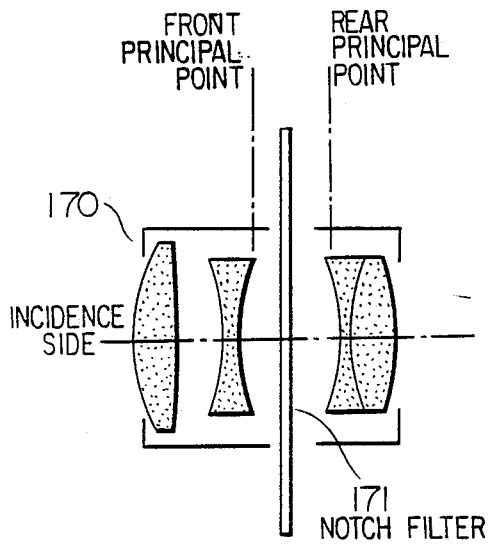
FIG. 12 schematically illustrates a lens system equipped with a notch filter.
Figure 13:
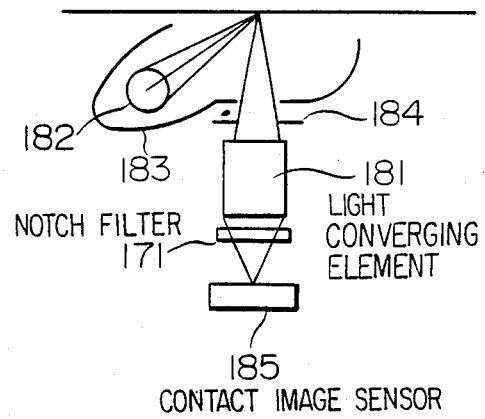
FIG. 13 schematically illustrates the constitution of an image reader using a light converging element.

To improve the color separation characteristics of a color separation filter, a notch filter may be incorporated; this filter eliminates light of bands between B and G, and G and R. As the notch filter, an interference filter is preferably used, and, for example, a notch filter having spectral characteristics as shown in FIG. 11 is used. This notch filter 171 is located in front of or behind lens system or between lenses, when incorporated into a lens system 170 shown in FIG. 12. When incorporated into a contact color sensor, the filter 171 is located in front or behind a light converging element. FIG. 13 illustrates an image reader using a light converging element 181. In this figure, numeral 182 represents an exposing lamp for exposing an image; 183, a reflector mirror; 184, a slit; 185, a contact image sensor. The B, G, and R signals from the buffer memory are converted into complementary colors Y, M, and C, and subjected to tone rectification. Next, a black component is sampled (UCR) from the respective Y, M, C data groups. Chromatic components and an achromatic component are thereby separated from each other. Then, the chromatic components, i.e., Y, M, and C components are subjected to color rectification, and together with a black component (BK) subjected to toner rectification and input to a pattern generator (PG). In this example, the color components are converted into digital dot pattern signals based, for example, on the dither method, and stored onto a page memory for independent colors. These groups of image data are being output, in conjunction with the rotation of the image carrying member, to a recorder, via a line memory that is needed as a buffer. Writing and image forming are thereby performed. In FIG. 7, during the first turn of the image carrying member, a C dot pattern is output by the first latent image forming means via a selector that selects color information; a Y dot pattern is output by the second latent image forming means via a delay circuit that incorporates a delay between two times of toner image forming respectively by the first and second image forming means. In the second turn, when the rotating image carrying member resumes the position of the preceding image forming, an M dot pattern is output by the first latent image forming means via the page memory based on the writing timing. After a specific delay, a BK dot pattern is similarly output by the second latent image forming means.

Figure 8:
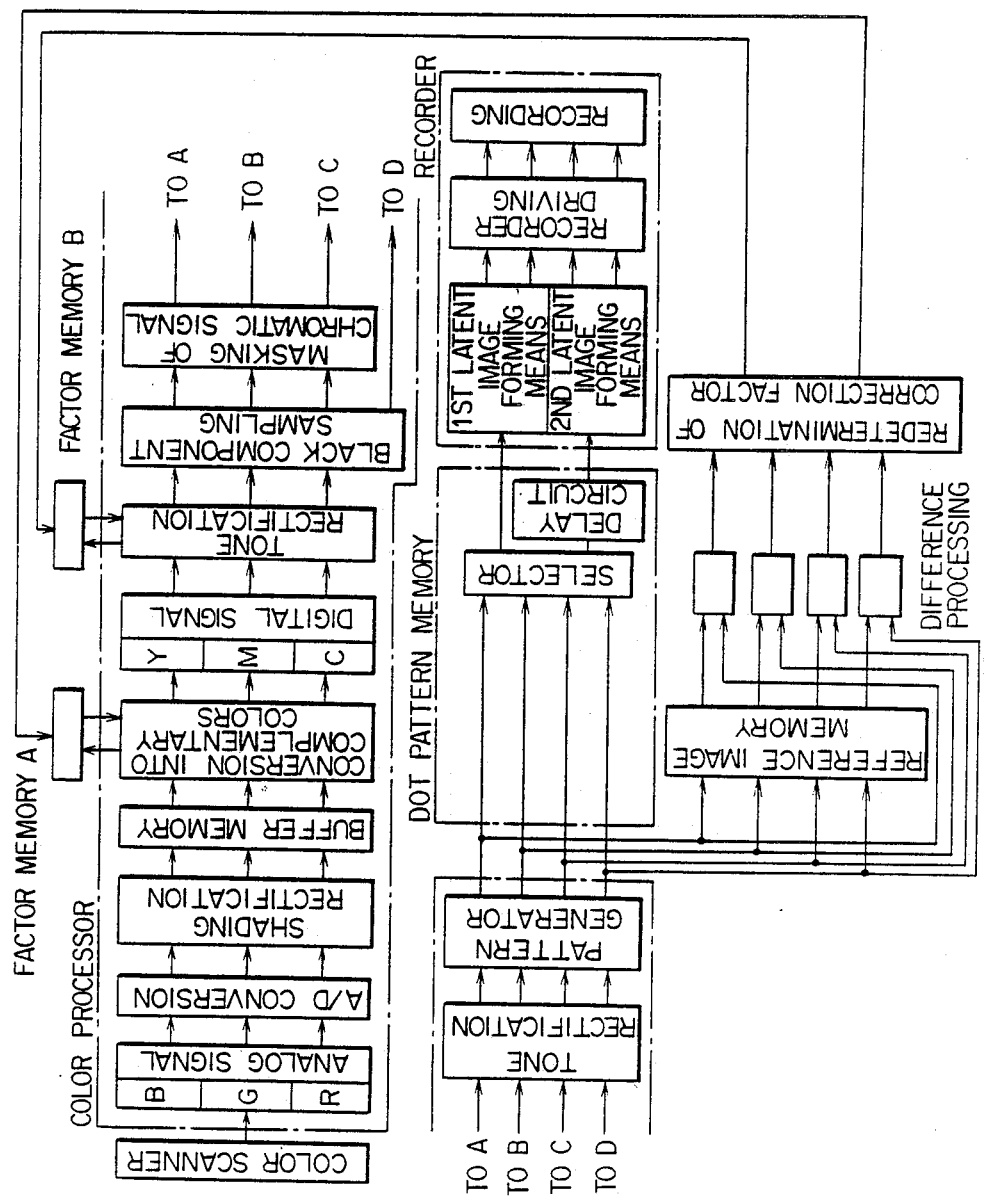

FIG. 8 shows an arrangement with a significantly reduced image memory. Like the arrangement in FIG. 7, image data are input to a pattern generator (PG) in the course of the first scanning by a color scanner. In this example, the image data are converted into digital dot pattern signals based, for example, on the dither method, wherein a C dot pattern signal that is the first signal subjected to writing is, transferred via a line memory that is needed as a buffer. Writing and image forming are performed as virtually synchronized with the reading. At the same time, a Y dot pattern signal that is the second signal subjected to writing is output to a recorder via a delay circuit that coordinates two image forming means. An M dot pattern is, during the next turn of the image carrying member, retrieved in conjunction with the writing timing based on re-scanning by a color scanner, and after a specific delay, a BK dot pattern is similarly retrieved via a delay circuit. The color scanner is driven in conjunction with the rotation of the image carrying member.

In FIGS. 7 and 8, the delay circuit is an image memory and also functions as a shift register. This image memory compensates the difference of writing timing that lies between the two image forming means.

In an ordinary color mode, a developing unit containing a toner of a color that corresponds with image data is actuated. In the image forming apparatuses in FIGS. 1(a) and (b), the developing units 31 and 32, respectively, have a cyan toner and magenta toner perform developing of image data that are output without being transmitted via a delay circuit. The developing units, respectively, having a yellow toner and black toner perform developing of image data that are output via a delay circuit. The image forming means 21 corresponds with the first image forming means, and the image forming means 22 corresponds with the second image forming means. The position, on the photosensitive drum, of the first latent image forming means differs from that of the second one. Accordingly, the timing for transmitting data from the delay circuit must be precisely delayed after another group of data has been similarly transmitted. The delay for transmitting the second group of data is controlled by counting the first horizontal synchronizing signal (pulses), and once a predetermined counting number is reached, the second image information (color information) is transmitted. Alternately, similar timing can be set by using the status of drum rotation that is detected by a drum encoder or the like, or based on the time elapsed.

The method in FIG. 8 requires that the reading system be reset prior to the initiation of the next writing, and further requires that toner images be aligned on the image carrying member. Satisfying these requirements using mechanical means is extremely difficult, and, therefore, it is recommended, that a line member serving as a buffer be incorporated for each color screen. More specifically, precisely aligning images is achieved by: for designating a document position, in the course of shifting of a light source (initiation of document reading), a reference point on a platen, or a reference point on a specific position in the shifting path of the light source, or a document end as a reference point is being read and stored in a buffer memory; and at the same time, by performing the second writing onwards based on the writing timing dependent on the signal that indicates the reference M toner image formed on the drum.

The so-overlapped toner images are subjected to a pre-transfer electrifier 13 and exposing lamp 41 which both promote easy transfer, and then, by the operation of a transfer electrode 14, are transferred onto a transfer sheet P being fed from a cassette. The transfer sheet P is separated by the operation of a separation electrode 16, and heated by a fixer 61 to fix the toner image. Once transfer is completed, the toner remaining on the surface of image carrying member 1 is cleaned by a neutralizing unit 15 and a cleaning unit 51 having a cleaning blade in order to prepare the next image forming.

Figure 9:
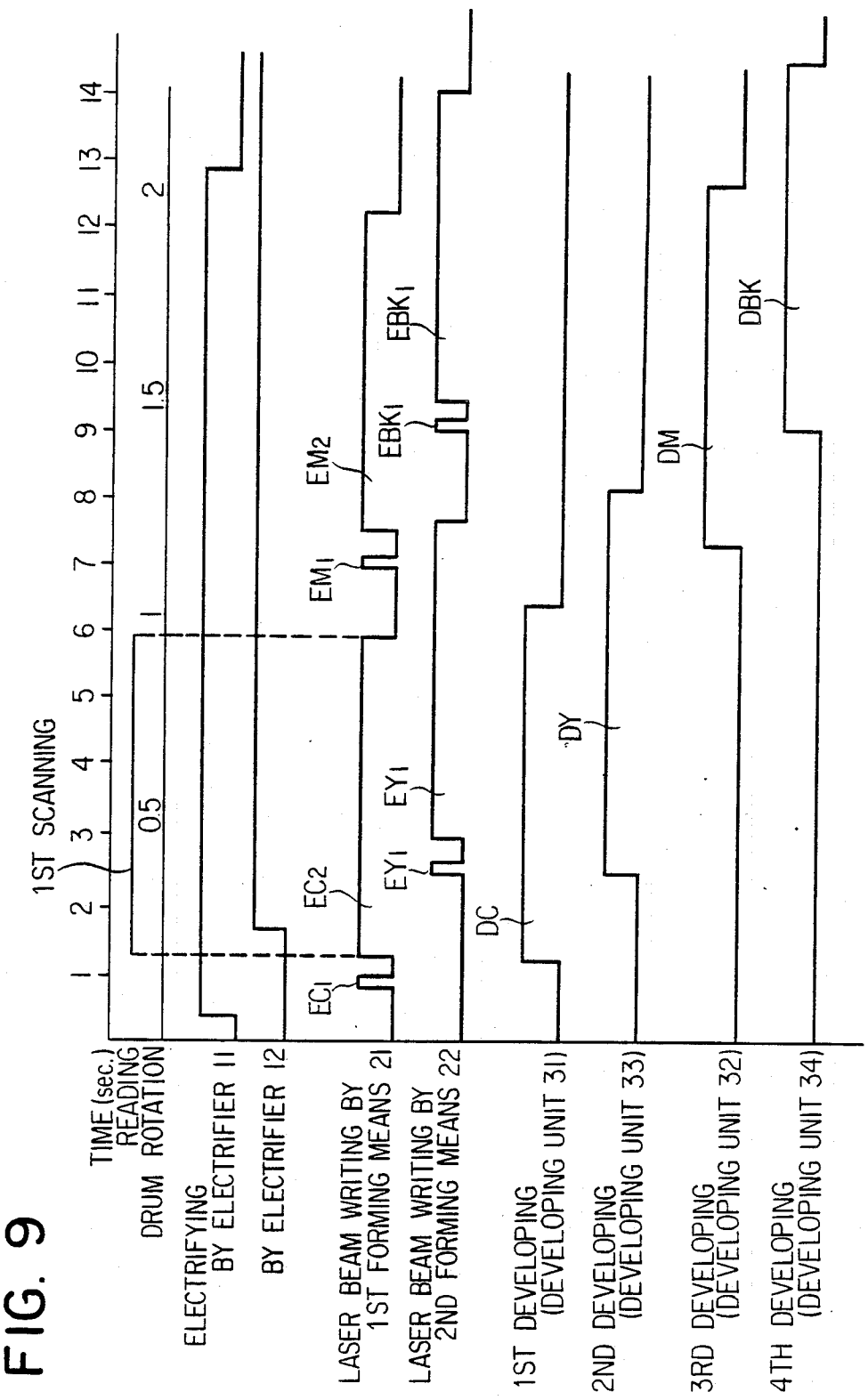
FIGS. 9 and 10 are timing charts illustrating image forming.
Figure 10:
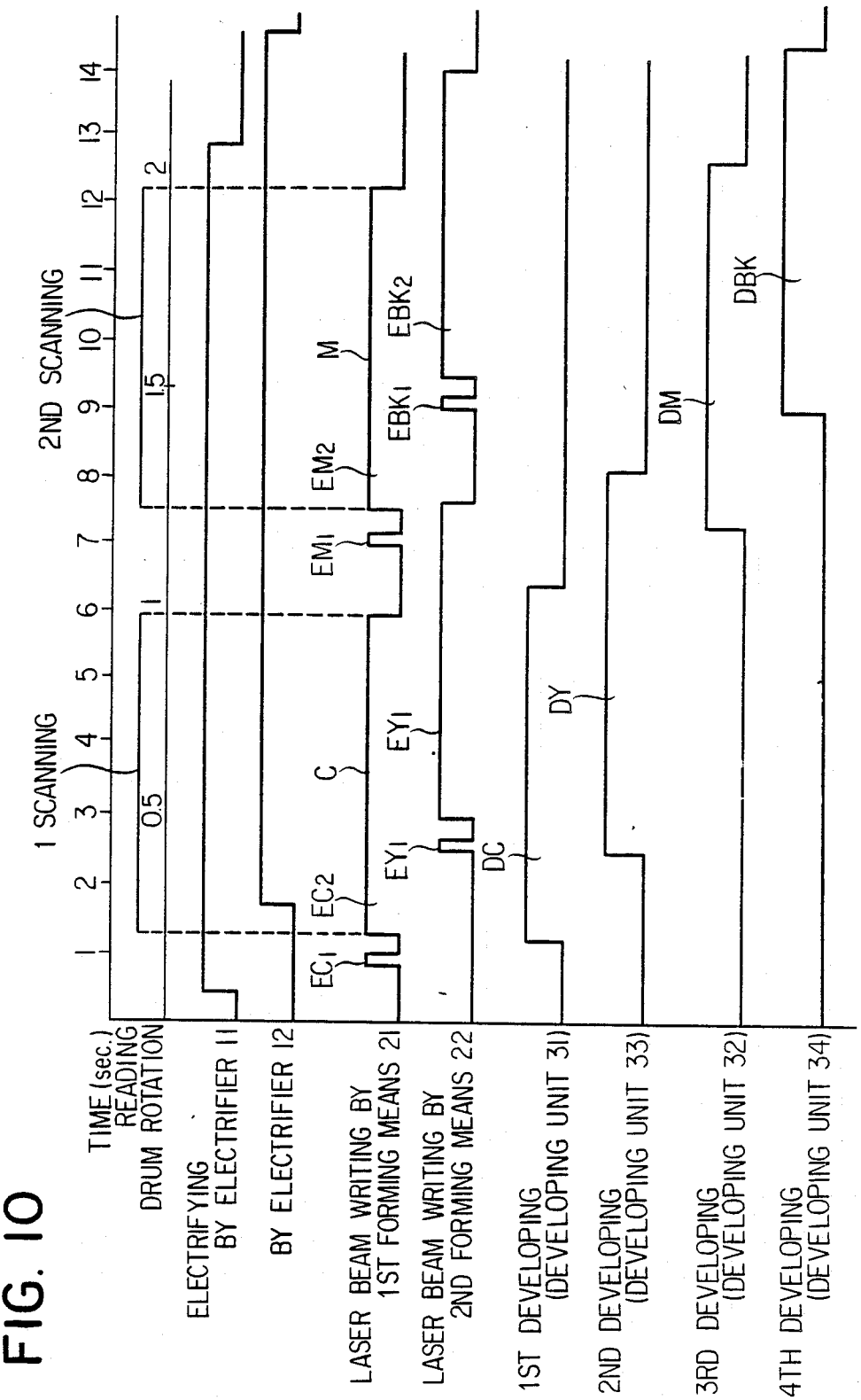

FIGS. 9 and 10 are timing charts, respectively, illustrating the timing of image forming in FIGS. 7 and 8. The reference signals $Ey_1$, $Em_1$, $Ec_1$, and $Ek_1$, are reference density patterns, for toner concentration control, electrifying potential, exposure intensity, and for feedback of developing bias, and are capable of providing a color image of greatly improved reproduction.

Figure 14:
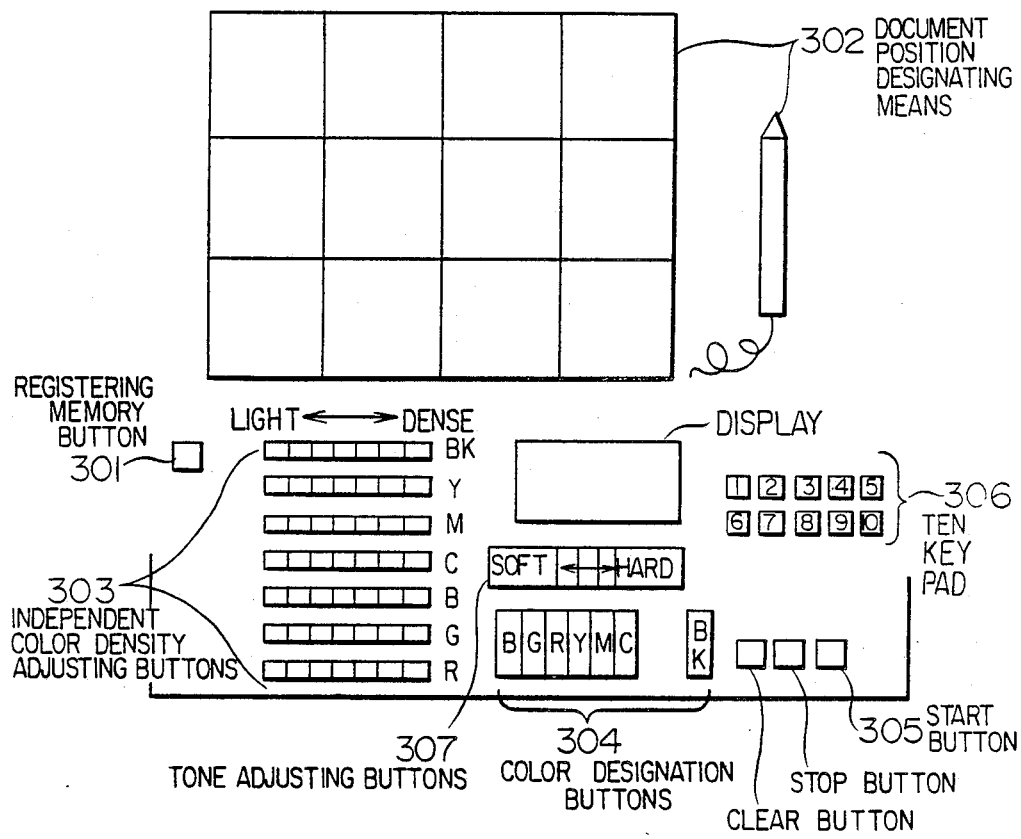
FIG. 14(a) illustrates an embodiment of a panel on a color image forming apparatus.
FIG. 14(b) is one example of the layout on a reference document.
Figure 14:
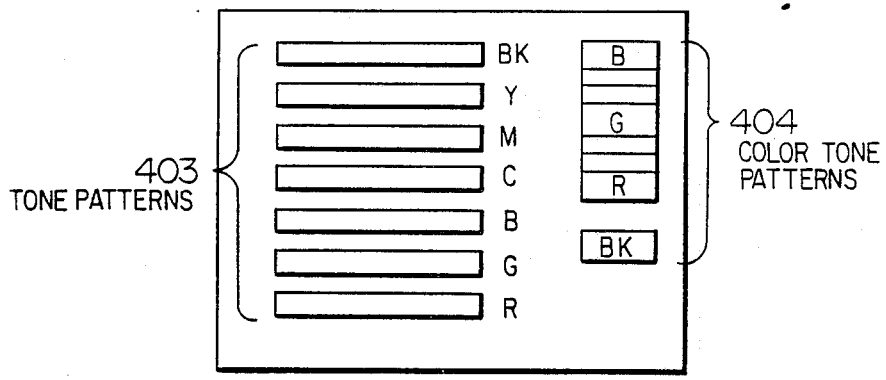

According to the invention, once a memory registering button 301 on a panel of the image forming apparatus in FIG. 14(a) is pressed, a reference document shown in FIG. 14(b) is being read. This step hereinafter is called the first step. In advance, all of or a specific region in an area intended for precise reproduction is designated by document position designating means 302. For example, when either or both of a tone pattern area using tone patterns 403 and/or a color tone pattern using color toner patterns 404 is (are) scanned by reading means that designates a specific position on these patterns, thereafter the original image read from a specified area or the whole screen is, as shown in the flowchart in FIG. 7 or 8, subjected to color tone rectification by the complementary color conversion portion and to tone rectification by the tone rectification portion next to the conversion portion. Rectification for each color is processed based on the correction factor stored in each corresponding memory, and the original image data is stored in a reference image memory and is printed out. Next, the second mode is started so that the printed (duplicated) document is placed on the platen, and read by a color image reader. The copy image data having been read is re-subjected to the same process and to data processing based on the correction factor stored in each corresponding memory, and then the copy image data is outputted from pattern generator.

The copy image data for each color are compared with the original image data stored at the first mode in reference image memory, and then the differences between them are calculated. The correction factors are newly determined on the basis of the result of the calculation. In usual copy mode for copying various original documents, image data will be rectified by using the correction factors currently determined by above first and second modes, and then the rectified image data will be printed out.

This image forming apparatus is provided with a surface potentiometer and a reflective densitometer in order to prevent fluctuation in color reproduction and density on the printer portion. By detecting the surface potential and density, and by correspondingly adjusting the voltage being applied to electrifiers, laser intensity, and developing bias, the reference patch image of each independent color is positively allowed to have a constant specific toner density. Naturally, this arrangement alone is not sufficient in accurately reproducing colors. Additionally, the image data read by the scanner is not necessarily always constant. Furthermore, the total color tone and gradation are not always reproduced accurately. Therefore, in the case that accurate color is requested, the color reproduction condition may be determined by performing above correction.

Figure 15:
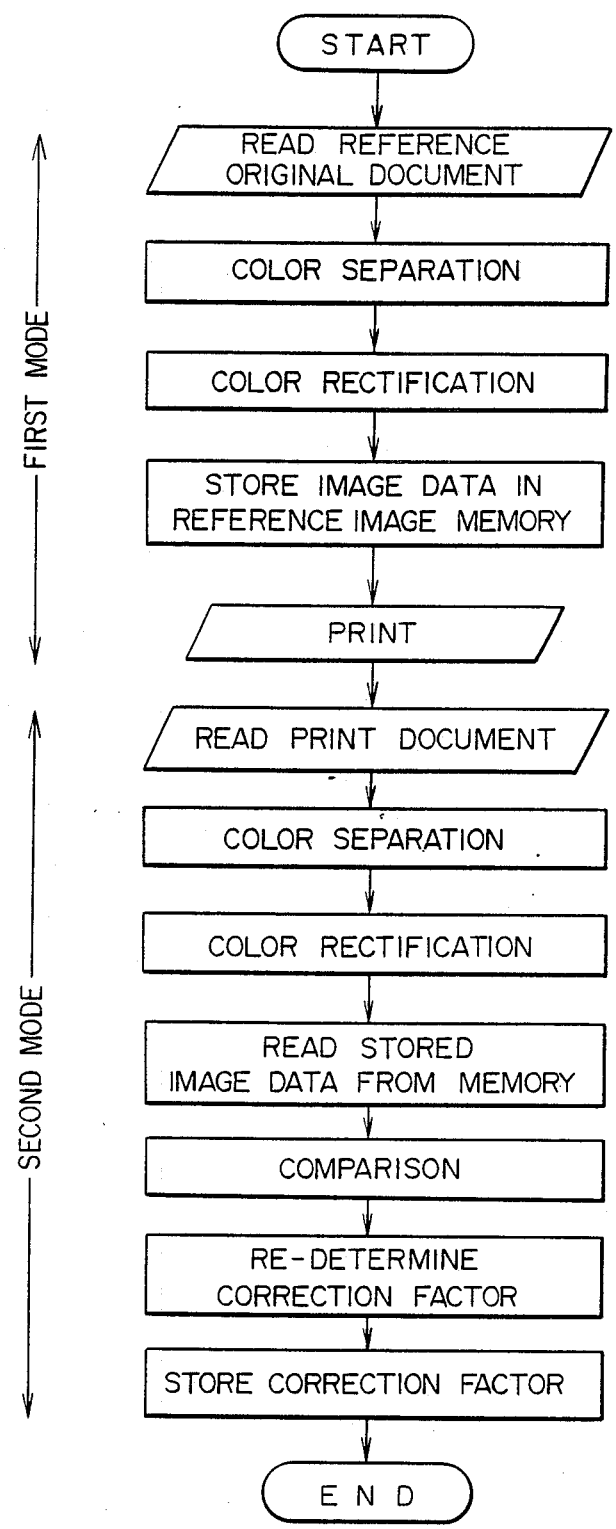
FIG. 15 is a flowchart illustrating the overall operation according to the invention.

FIG. 15 illustrates a flowchart representing the abovementioned first and second modes. Namely, in the first mode, the reference document is read and the read original image is subjected to the color separation and the rectification process. The obtained original image data is thereby stored in the reference image memory and a copy image is printed out on the basis of the data. In the second mode, the copy image printed out at the first mode is read and the read copy image is subjected to the color separation and the rectification process, and then the obtained copy image data are processed by comparing with the original image data stored in the reference image memory. The correction factors are newly determined on the basis of the processing result and the determined correction factors are stored in the corresponding factor memory.

The area that is subjected to the above-mentioned comparison is set within the previously mentioned designated image area. More specifically, the separated independent color components Y, M, and BK are subjected to differentiation based on the respective image densities. Arithmetical integration is thereby performed on each designated area. In the case of a larger image area, sampling intervals are set larger in compliance with a memory capacity, and in order to make the difference smaller, the previously mentioned correction factor is determined. The correction factor is stored in the factor memory, which is a RAM, and re-used as a correction factor for copying. The memory in the RAM can be backed up, so that it can be maintained even when a power switch is turned OFF.

The above-mentioned arithmetic operation for image data is defined by the following expressions.

A complementary color conversion that performs color tone rectification performs the following conversion, i.e., linear masking operation.

$$\begin{pmatrix} Yi \\ Mi \\ Ci \end{pmatrix} = \begin{pmatrix} a_{11} a_{12} a_{13} \\ a_{21} a_{22} a_{23} \\ a_{31} a_{32} a_{33} \end{pmatrix} \begin{pmatrix} Bi \\ Gi \\ Ri \end{pmatrix}$$

Bi, Gi, and Ri are independent-color data representing logarithmically converted values of densities that have been input by scanner and undergone shading rectification; Yi, Mi, and Ci are independent-color data representing values of densities undergone complementary-color conversion.

The factor {aij} is a factor determined by an experiment, and is in advance stored in the factor memory A.

Figure 18:
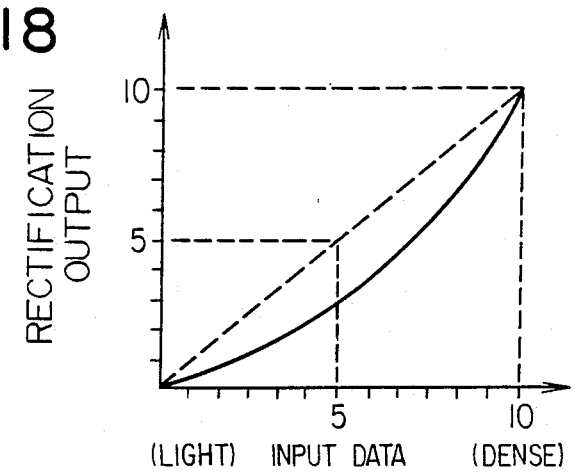
FIG. 18 shows an input/output density correction characteristic curve.
Figure 19:
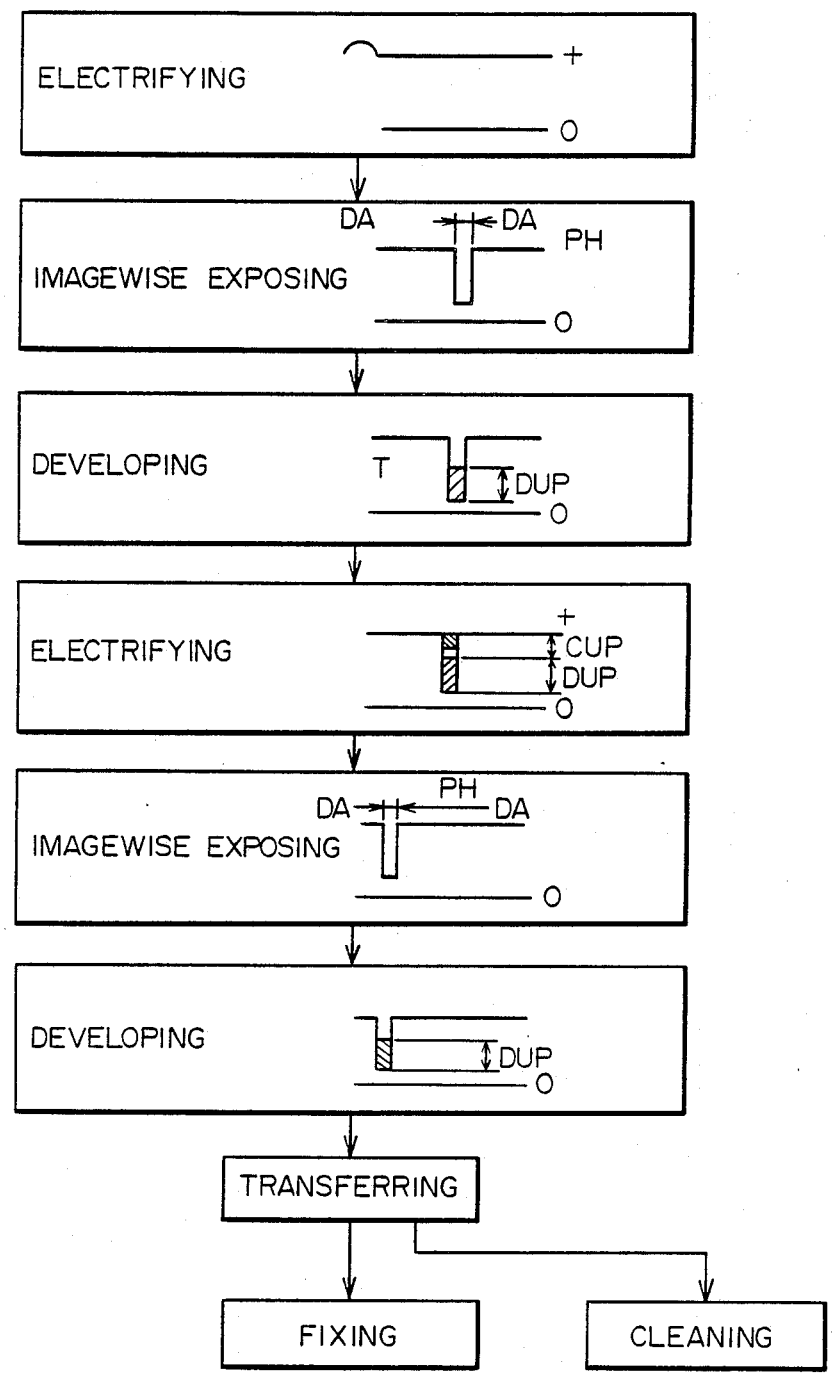

Next, tone rectification is effected as indicated by and input data curve and a rectified output curve in FIG. 18, wherein input data indicated with a dotted line are corrected to a $\gamma$-rectified curve indicated with a solid line. More specifically, data stored in the factor memory B are corrected to the data on the rectified curve based on the backup table method. The factor memory B is selectively driven based on the developing characteristics and dither pattern.

Next, a black component is singled out. The black component differentiation is performed based on the following expressions.

$$B_0 = \alpha_1 Bi + \beta_1 \text{ min } (Yi, Mi, Ci)$$

$$Y_0 = \alpha_2 Y_i + \beta_2 \min(Y_i, M_i, C_i)$$

In these expressions, Bi, Yi, Mi, and Ci, represent independent-color input data each representing density values independent color components BK, Y, M, and C, each being input into an arithmetic processing portion; $B_0$, $Y_0$, $M_0$, and $C_0$, represent densities values of independent color components BK, Y, M, and C, each being converted on the arithmetic procession portion; min (Yi, Mi, and Ci) represents data corresponding with a minimum density value in three primary color data Yi, Mi and Ci; and $\alpha_1$, $\alpha_2$, $\alpha_3$, $\alpha_4$, $\beta_1$, $\beta_2$, $\beta_3$, and $\beta_4$, represents parameters capable of being modified by external instructions.

The histogram showing the respective color density levels Yi, Mi, Ci, and Bi, is shown in FIG. 16(a); and FIG. 16(b) shows the respective color density levels of data $Y_0$, $B_0$, $C_0$, and $M_0$ each obtained by arithmetic operation based on the assumption that parameters $\alpha_1$ through $\alpha_4$ and $\beta_1$ through $\beta_4$ are commonly 1.

FIG. 16(a) shows unchanged input data, while FIG. 16(b) shows data converted in the arithmetic processing portion. Comparing FIG. 16(a) with (b) demonstrates that the converted data shown in (b) mean significantly smaller amounts of toners adhering onto the photosensitive member 1. In other words, performing UCR with $\beta_2$ through $\beta_4$ each slightly greater than zero is advantageous in that, in an image forming method where a plurality of toner images are formed in an overlapping manner on the image carrying member, a new toner image is formed as less affected by an already formed toner image. $\beta_2$ through $\beta_4$ are preferably within a range of 0 to 1.

If a memory registering button 301 has been pressed for color tone adjustment, the data which have undergone black-component separation are not subjected to data correction in a chromatic signal masking portion and a tone rectification portion. Such data correction is performed only if a independent-color density adjustment button 303 or tone adjustment button 307 has been pressed in a normal copy mode in order to vary color tone or gradation.

Next, image data converted into a dither pattern by a pattern generator are stored in the reference image memory at the first mode. Additionally, the image data is outputted to the printing device, and the printed sample is then prepared based on such image data. At the second mode, the data of the printed sample are re-fed by the color scanner. Such copy image data are subjected to the similar image processing, and sequentially outputted via the pattern generator. The difference between such copy image data and the data in the corresponding location in the dot reference image memory are calculated for each color.

The calculations are performed by the following expressions:

$$\Delta B = \frac{\sum_{x,y} |B_O(X,Y) - B_c(X,Y)|}{\sum_{x,y} B_O(X,Y)}$$

$$\Delta Y = \frac{\sum_{x,y} |Y_O(X,Y) - Y_c(X,Y)|}{\sum_{x,y} Y_O(X,Y)}$$

-continued $$\Delta M = \frac{\sum_{x,y} |M_O(X,Y) - M_c(X,Y)|}{\sum_{x,y} M_O(X,Y)}$$

$$\Delta C = \frac{\sum_{x,y} |C_O(X,Y) - C_c(X,Y)|}{\sum_{x,y} C_O(X,Y)}$$

wherein $B_O$, $Y_O$, $M_O$, and $C_O$ are respectively image data having been input based on the reference document; $B_c$, $Y_c$, $M_c$, and $C_c$, are respectively image data having been input based on a copy sample of the reference document. (X, Y) represents coordinates in the document subjected to sampling. The arithmetic results ($\Delta_B$, $\Delta_Y$, $\Delta_M$, $\Delta_C$) correspond with the color difference between the document and the copy sample.

In this arithmetic operation,, the difference in information of gradation for each color. However, it is possible to detect which density portion on a specific color image is deviated from a counterpart on a document, by subdividing the above arithmetic operation into sub-operations corresponding to specific density ranges for each color. Each sub-divided area is thereby subjected into the arithmetic sub-operation.

By using the resultant difference data, for example, the complementary-color conversion factor and the tone rectification factor may be newly determined by referring to a table prepared by experiment.

Figure 17A:
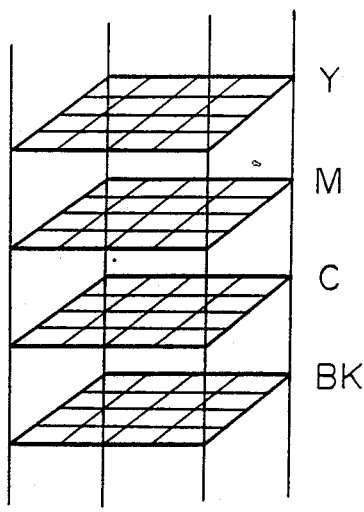
FIGS. 17(a) and 17(b) show dither matrixes based on Y, M, C, and BK components.
Figure 17B:
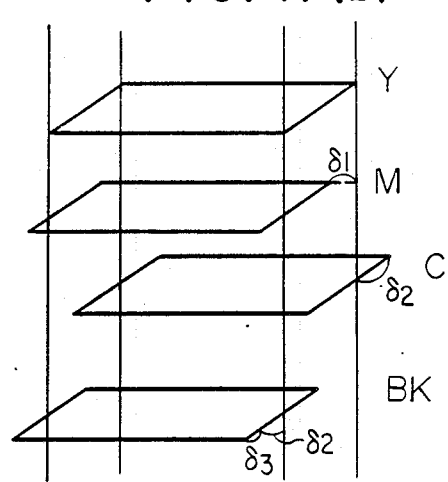

FIG. 17(a) illustrates 4×4 dither matrix used on a pattern generator for processing rectified image data, wherein the matrix has threshold values for each of Y, M, C and BK image components, and accordingly, the respective images are formed on a common position. More specifically, the respective pixels of the respective colors are alloted to specific common positions, and image forming by writing and depositing toners is performed on these specific common positions. FIG. 17(b) shows an operation where M, C, and BK components are written as respectively staggered by $\equiv_1$, $\equiv_2$, $\equiv_3$, and $\equiv_4$.

Additionally, in an arithmetic operation based on the above algorithm, any input data can be used as far as the similar data include color information. For example, when transmitting a TV image, blue, green, and luminance levels are displayed as the primary three colors of the additive color process based on the Y, I, and Q signals, whereby the similar luminance levels may be converted into density levels of the three primary colors of the subtractive color process, i.e., Y, M, and C. The analog Y, M, and C output signals from an image pick-up tube or the like can be used unchange as input data for an arithmetic operation, or these signals may be used as input signals by digitization or by incorporating other data.

Figure 16:
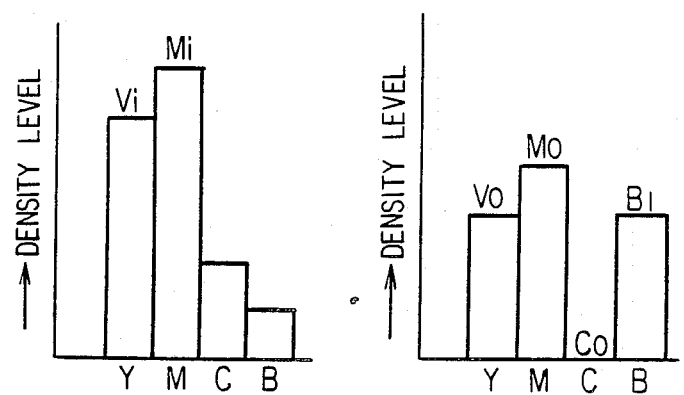
FIG. 16 is an explanatory diagram illustrating histograms of the respective color density levels.

The algorithm as the previously mentioned arithmetic operation is hereunder described in detail by referring to FIGS. 16 and 17. FIG. 16 shows the respective total sums of the respective color density levels of the respective colors. As in the case of input data in FIG. 16(a), the levels in FIG. 16(a) are converted into those in (b) using the three primary colors Y, M, and C of a common density level makes BK when blended together. More specifically, the level equal to Ci that has a minimum density level among input data is reduced from the above data Yi, Mi, and Ci, thereby the level is replaced with the BK component. By processing image data in this way, i.e., by processing the difference, advantageously enables accurate detection of fluctuation in Y, M, C, and BK components in input data.

According to the present embodiment, it is possible to designate a parameter externally. Also, it is possible to incorporate a method for feeding back data to the developing bias. According to the invention, designating a specific image area may be performed with a digitizer. Based on a signal corresponding with the designated area, the area being processed is determined, and an arithmetic processing portion (in FIGS. 7 and 8, this portion corresponds with the achromatic signal masking portion and the next tone rectification portion) designates a parameter only for the designated image area. Accordingly, it is possible to designate a tone in a specific area.

Next, when comparing a density level of each pixel in a document data processed as shown in FIGS. (a) and (b) with the similar level in printed image data, the comparison may be performed on the whole pixels in a designated image area or on sampled pixels. Otherwise, levels of several pixels may be averaged, then subjected to differentiation. Such arrangements allows a smaller capacity differentiation data memory to perform differentiation satisfactorily.

The so-determined parameter is registered in a memory. Document scanning may be repeated in determining the parameter, and parameter values are thereby converged to a specific value. This arrangement enables highly appropriate parameter determination. Color tone may be likewise given higher priority.

The present invention provides a color image forming apparatus comprising image reading means and color image output means, wherein a vivid color image of good color balance is obtained by comparing an original document with a duplicated document in order to correct color tone and gradation.

Additionally, sometimes, there is a need for reproducing a specific area in document having a specific color which must be reproduced correct in tone and gradation. In this case, a user has been conventionally supposed to reproduce the specific area with good color balance at the cost of imbalanced colors in an area other than the specified area or in the whole document area. In contrast, the document position designating means of the present invention gives priority to the specified area as well as maintains the color balance in the whole document area.

What is claimed is:

1. A color image processing apparatus comprising;
   image-reading means for reading a color image on an original to obtain first color image data;
   a factor memory for storing a predetermined correction factor;
   correction means for correcting the first color image data with the correction factor;
   an image memory for storing the corrected first color image data;
   image-producing means for producing a color copy image on the basis of the corrected first color image data, the image-reading means being adapted to read the color copy image to obtain second color image data and the correction means being adapted to correct the second color image data with the correction factor; and
   processing means for performing a comparison of the corrected first color image data stored in the image memory and the corrected second color image data, and changing the correction factor on the basis of the comparison.

2. The color image processing apparatus of claim 1, wherein the image-producing means includes a photoreceptor for forming an electrostatic latent image on the basis of the corrected first color image data and developing means for developing the electrostatic latent image so as to form a toner image.

3. The color image processing apparatus of claim 2, wherein the image-producing means includes means for superimposing plural toner images to form a composite color toner image, and wherein the composite color toner image is used as the color copy image.

4. A color image processing apparatus comprising:
   image-reading means for reading a color image on an original to obtain first color image data;
   an image memory for storing the first color image data;
   a factor memory for storing a predetermined correction factor;
   correction means for correcting the first color image data with the correction factor;
   image-producing means for producing a color copy image on the basis of the corrected first color image data, the image-reading means being adapted to read the color copy image to obtain second color image data; and
   processing means for performing a comparison between the first color image data stored in the image memory and the second color image data and changing the correction factor on the basis of the comparison.

* * * * *